United States Patent [19]

Stuible et al.

[11] Patent Number: 5,650,718
[45] Date of Patent: Jul. 22, 1997

[54] METHOD AND DEVICE FOR MONITORING ROTATIONAL SPEED SENSORS OF VEHICLES FOR FAULTS USING A SLIP COEFFICIENT WEIGHTED BY TIME

[76] Inventors: Ewald Stuible, Am Blaichberg 11, 71735 Eberdingen; Walter Berger, Rosenfeld 110, 74391 Erligheim; Martin Pfau, Weissdornweg 3, 71287 Weissach; Robert Kornhaas, Bromberger Weg 6, 71701 Schwieberdingen, all of Germany

[21] Appl. No.: 540,647

[22] Filed: Oct. 11, 1995

[30] Foreign Application Priority Data

Nov. 12, 1994 [DE] Germany .................. 44 40 518.9

[51] Int. Cl.⁶ .................. G01P 3/56; H02H 7/06
[52] U.S. Cl. .................. 324/161; 361/238
[58] Field of Search .................. 361/238, 236, 361/239, 242; 364/426.02–426.04, 565; 324/160, 166, 167, 173, 174, 178, 207.25

[56] References Cited

U.S. PATENT DOCUMENTS

| 4,667,114 | 5/1987 | Rossi .................. 290/40 A |
| 5,016,724 | 5/1991 | Steinhagen et al. .................. 180/197 |
| 5,277,482 | 1/1994 | Beyer et al. . |
| 5,301,130 | 4/1994 | Alcone et al. .................. 364/565 |
| 5,436,836 | 7/1995 | Holtz et al. .................. 364/426.02 |

FOREIGN PATENT DOCUMENTS

| 3501435 | 7/1986 | Germany . |
| 3841958 | 6/1990 | Germany . |

*Primary Examiner*—Sandra L. O'Shea
*Assistant Examiner*—Roger C. Phillips

[57] ABSTRACT

A method and a device for monitoring rotational speed sensors, in particular rotational speed sensors for identifying the wheel speed, are described. A fault is detected if a slip coefficient which is weighted with the time exceeds a threshold value.

5 Claims, 2 Drawing Sheets

METHOD AND DEVICE FOR MONITORING ROTATIONAL SPEED SENSORS OF VEHICLES FOR FAULTS USING A SLIP COEFFICIENT WEIGHTED BY TIME

PRIOR ART

The invention relates to a method and a device for monitoring rotational speed sensors.

Such a method and device for monitoring rotational speed sensors are known from German Offenlegungsschrift 35 01 435. In the said publication a method and a device are described. For this purpose, two sensors are provided which supply a rotational speed signal. In order to monitor the two sensors the frequencies of the two sensors are compared. If the ratio of the two frequencies deviates from one another by more than a prescribed percentage, a fault is detected. Under certain conditions it may be the case that the two sensors supply different rotational speed values. This is for example the case if the sensors sense the rotational speeds of the two wheels of one axle. When cornering, the two rotational speed values deviate from one another.

In addition, German Offenlegungsschrift 38 41 958 (U.S. Pat. No. 5,277,482) discloses an anti-lock brake control system. The control is switched off if, under certain conditions, the slip value of two wheels rises above a prescribed value for a prescribed time. This takes place against the background that when an inflatable spare tire is used no anti-lock brake control is to take place. The monitoring of rotational speed sensors is not addressed here.

OBJECT OF THE INVENTION

The invention is based on the object of providing, in a device and a method for monitoring rotational speed sensors, a method of detecting defects which is as simple and reliable as possible. This object is achieved by means of the features characterized in the independent claims.

ADVANTAGES OF THE INVENTION

Advantages and expedient embodiments and refinements of the invention are characterized in the subclaims.

BRIEF DESCRIPTION OF THE DRAWINGS

The invention is explained below with reference to the embodiment illustrated in the following drawings.

Figure 1:
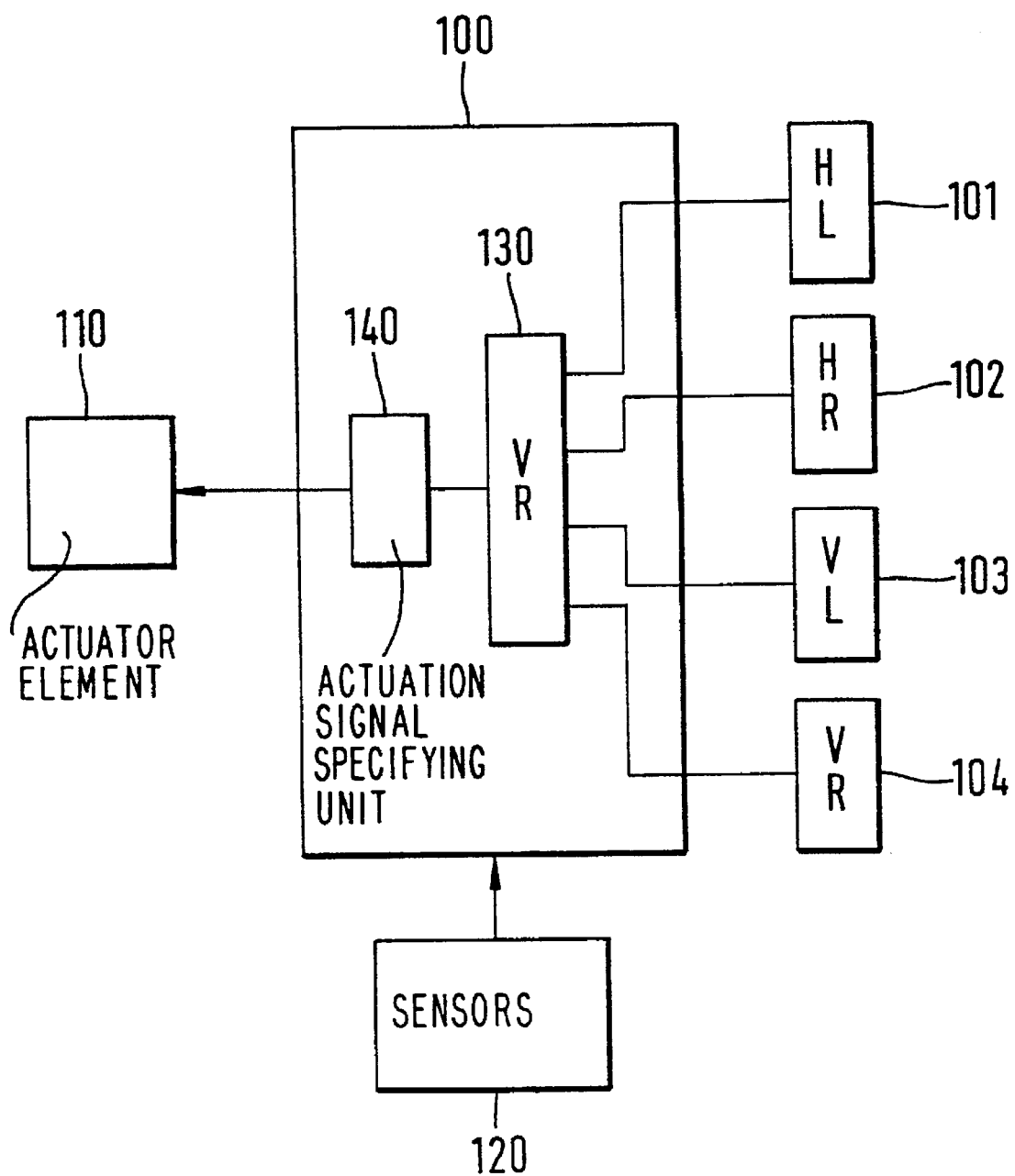
FIG. 1 shows a block diagram of the device according to the invention.

DETAILED DESCRIPTION OF THE INVENTION 100 designates a control unit which processes signals from various sensors 101, 102, 103 and 104. The sensors 101 to 104 sense the rotational speed of the individual wheels of the motor vehicle. Thus, the sensor 101 senses the rotational speed of the rear left-hand wheel, the sensor 102 senses the rotational speed of the right-hand rear wheel, the sensor 103 senses the rotational speed of the front left-hand wheel and the sensor 104 senses the rotational speed of the front right-hand wheel.

The control unit 100 supplies an actuation signal to an actuator element 110. Furthermore, the control unit 100 processes signals from various further sensors 120. The sensor signals from the sensors 101 to 104 are fed to an evaluation device 130 which in turn supplies signals to an actuation signal specifying unit 140 and actuates the actuator element 110 as a function of these signals.

Preferably, the control unit 100 is an anti-lock brake control device or a traction control system. The described procedure is however not limited to such control units, it can be used in all control units in which the rotational speeds of the individual wheels are evaluated.

The invention is described by way of example for a motor vehicle with four wheels. However, it can also be extended to motor vehicles with a different number of wheels. In principle, the invention can also be applied to vehicles in which only two rotational speed sensors are present.

The evaluation device 130 evaluates the different wheel speeds and compares them with a reference speed VR. This reference speed corresponds to the travel speed of the vehicle. The reference speed is formed for example from the wheel speed averaged over all the wheels. On the basis of this comparison the actuation signal specifying unit 140 calculates a signal to be supplied to the actuator element 110, which signal, for example in the case of an anti-lock brake control device, reduces the braking pressure in a wheel which is locking.

In a traction control system the actuator element 110 can also be the throttle valve or another power-determining actuator element.

Figure 2:
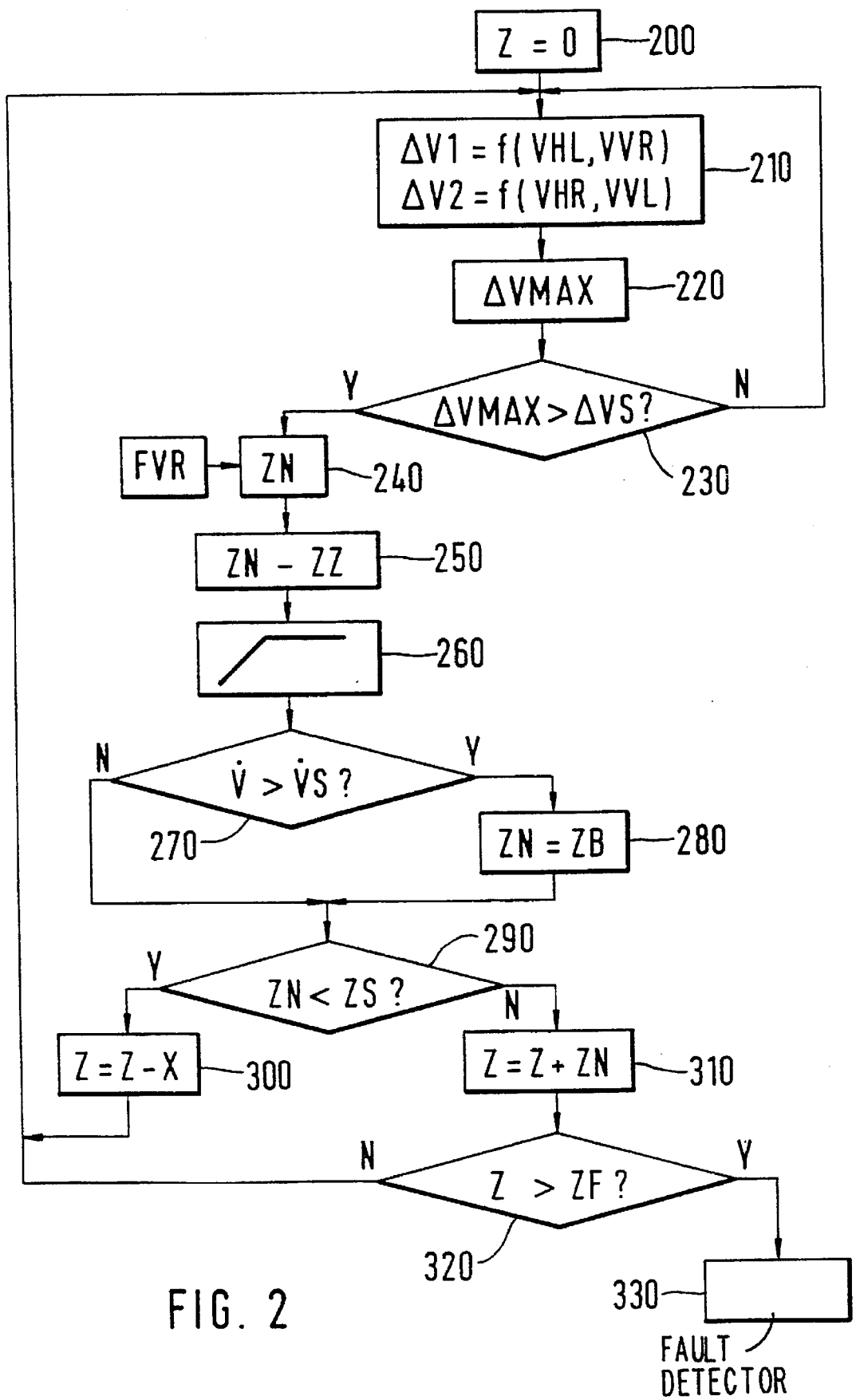
FIG. 2 shows a flow diagram of the method according to the invention.

In order to avoid incorrect functioning of the control unit 100 and faulty activation of the actuator element 110, faults in the region of the sensors 101 to 104 must be reliably detected. Given a fault in the region of the sensors or in the evaluation of the sensor signals, corresponding measures must be initiated. For example, it must be indicated to the driver of the vehicle that the control unit is not operating correctly. This is particularly the case if one of the sensors is operating incorrectly. In this case, the sensor supplies a signal which does not correspond to the actual rotational speed. In order to ensure this, the procedure as illustrated in FIG. 2 is adopted.

The sensors 101 to 104 produce speed-dependent pulse sequences using pulse wheels which are mounted on the wheels.

The checking is based on the comparison of the wheel speeds of the different wheels with one another. These wheel speeds are identical when traveling straight ahead and with identical tires. In one embodiment of the invention there may also be provision for the wheel speeds not to be compared with one another but rather with the reference speed VR.

In a first step 200, a counter Z is set to 0. The contents of the counter correspond to a summed slip coefficient Z. Subsequently, in step 210 the wheel speed VHL of the wheel at the rear on the left-hand side, the wheel speed VVR of the wheel at the front on the right-hand side and the difference ΔV1 between these two wheel speeds are identified. Correspondingly, the difference ΔV2 between the wheel speed VHR of the wheel at the rear on the right-hand side and the wheel speed VVL of the wheel at the front on the left-hand side are identified.

Differences between other pairs of wheels can also be identified. However, pairs of wheels between a driven and a non-driven axle are preferably formed.

Subsequently, in step 220, the difference which is greatest in terms of absolute value is identified as ΔVMAX. This difference ΔVMAX indicates a wheel which is actually or supposedly (because of a fault) subject to slip. The subsequent interrogation 230 checks whether the absolute value of ΔVMAX is greater than a threshold value ΔVS. This threshold value ΔVS takes into account the fact that when cornering left-hand wheels and right-hand wheels rotate at different speeds. If the interrogation 230 detects that the identified difference ΔVMAX is smaller than the threshold value ΔVS, it is assumed that cornering is occurring. In this case, the program continues with step 210.

If, in contrast, the difference ΔVMAX is greater than the threshold value ΔVS, in step 240 a so-called instantaneous slip coefficient ZN is determined. This instantaneous slip coefficient ZN is a measure of the physical slip. Preferably, the normalized speed difference ΔVMAX is used as the instantaneous slip coefficient ZN. This means that the instantaneous slip coefficient ZN corresponds to the maximum difference ΔVMAX weighted with the vehicle speed VR. Preferably, in the lower speed range the instantaneous slip coefficient ZN is directly proportional to ΔVMAX, this means that the absolute value of ΔVMAX is used as the slip coefficient. In the upper rotational speed range, the instantaneous slip coefficient ZN is proportional to ΔVMAX/VR. The vehicle speed is for example the mean value of all the wheel speeds.

In step 250, the instantaneous slip coefficient ZN is reduced by the acceptable deviation between the wheel speeds ZZ. This value, by which the slip coefficient is corrected, takes into account tolerances owing to different diameters of the individual wheels. The value is dependent for example on whether the vehicle has a so-called inflatable spare tire. If an inflatable spare tire which has a smaller diameter is provided, the value ZZ is selected to be larger than in vehicles without an inflatable spare tire. This procedure permits very rapid fault detection. By selecting a suitable correction value ZZ, in step 250 it is possible to take into account the use of an inflatable spare tire in the vehicle.

The subsequent limitation 260 limits the instantaneous slip coefficient ZN to a maximum acceptable value.

Depending on how high the limit value is selected to be, the times within which faults are detected vary. In the case of a high threshold value, faults are detected relatively quickly and in the case of a low threshold value the fault detection takes correspondingly longer.

The interrogation 270 checks whether a wheel is spinning, that is to say whether a wheel which is actually subject to slip is present. This takes place in that it is checked whether the acceleration ύ of a wheel is greater than a threshold value ύS. If this is the case, spinning of the wheel is detected and the instantaneous slip coefficient ZN is set to a value ZB in step 280.

By means of the interrogation 270 and the step 280, speed differences owing to spinning wheels are greatly attenuated by reducing the instantaneous slip coefficient ZN. Spinning of a wheel is detected by the fact that the wheel is accelerated over a certain time.

This means that the instantaneous slip coefficient ZN is summed when certain conditions are present. For example, the slip coefficient is only summed when the deviation between the wheel speeds is greater than a threshold value ΔVS and none of the wheels is spinning. In addition, the slip coefficient is normalized to the travel speed VR, limited and reduced by an acceptable-deviation ZZ.

Subsequently, the interrogation 290 checks whether the instantaneous slip coefficient ZN is smaller than a threshold value ZS. If this is the case, the counter with the summed slip coefficient Z is reduced by a specific value X. If this is not the case, in step 310 the counter with the summed slip coefficient Z is increased by the value of the instantaneous slip coefficient ZN.

If the slip coefficient is greater than a threshold value ZS, the slip coefficient is summed. As soon as this summed slip coefficient exceeds a threshold value ZN, a fault is detected. If the slip coefficient is smaller than the threshold value ZS, the summed slip coefficient is reduced by a specific value. The result of this is that if no deviation occurs for a specific time, the slip counter Z assumes the value zero.

The interrogation 320 checks whether the contents of the counter are greater than a threshold value ZF. If this is not the case, the program continues with step 210. If this is the case, a fault is detected in step 330.

The described procedure can be applied over the entire speed range. Faults can be detected at any desired wheels. By virtue of the comparison of a wheel of a driven axle with a wheel of a non-driven axle, faults of the same kind at the two non-driven or at the two driven wheels can be detected. It is particularly advantageous that the detection time is dependent on the size of the fault. That is to say that serious faults which lead to a large difference in speed are detected relatively quickly, while faults which only result in a small difference in speed are only detected after a delay.

In a particularly advantageous embodiment there may be provision for a variable of the traction control system and/or the anti-lock brake control device which corresponds to the slip coefficient to be used as instantaneous slip coefficient ZN.

We claim:

1. A method for monitoring rotational speed sensors for identifying a wheel speed, comprising the steps of determining a first wheel speed of a first wheel and a second wheel speed of a second wheel; identifying an instantaneous slip coefficient on the basis of the determined first wheel speed and second wheel speed by determining a normalized difference between the first wheel speed and the second wheel speed; summing successive instantaneous slip coefficients in the presence of certain condition for obtaining a summed slip coefficient; and detecting a fault in the sensors if the summed slip coefficient exceeds a first threshold value.

2. A method as defined in claim 1, wherein said step of summing of includes summing the instantaneous slip coefficient if a difference between the wheel speeds is greater than a second threshold value and none of the wheels is spinning.

3. A method as defined in claim 1; and further comprising the step of limiting the instantaneous slip coefficient; and reducing it by an acceptable deviation.

4. A method as defined in claim 1; and further comprising the step of reducing the summed slip coefficient by a certain value if the slip coefficient is smaller than a third threshold value.

5. A device for monitoring rotational speed sensors for identifying a wheel speed, comprising means for determining a first wheel speed of a first wheel and a second wheel speed of a second wheel; means for identifying an instantaneous slip coefficient on the basis of the determined first wheel speed and second wheel speed by determining a normalized difference between the first wheel speed and the second wheel speed; means for summing successive instantaneous slip coefficient in the presence of certain conditions for obtaining a summed slip coefficient; and means for detecting a fault in the sensors if the summed slipped coefficient exceeds a first threshold value.

* * * * *